(12) United States Patent
Hill et al.

(10) Patent No.: US 7,366,777 B2
(45) Date of Patent: Apr. 29, 2008

(54) WEB APPLICATION ROUTER

(75) Inventors: Michael Sean Hill, San Francisco, CA (US); Joerg Mann, Palo Alto, CA (US)

(73) Assignee: SAP Aktiengesellschaft, Walldorf (DE)

( * ) Notice: Subject to any disclaimer, the term of this patent is extended or adjusted under 35 U.S.C. 154(b) by 842 days.

(21) Appl. No.: 10/438,268

(22) Filed: May 15, 2003

(65) Prior Publication Data

US 2004/0226459 A1 Nov. 18, 2004

(51) Int. Cl.
*G06F 15/173* (2006.01)

(52) U.S. Cl. ............... 709/226; 709/203; 709/217; 709/219; 704/270; 379/88.17

(58) Field of Classification Search ......... 709/203, 709/217, 219, 226; 704/270
See application file for complete search history.

(56) References Cited

U.S. PATENT DOCUMENTS

| | | | |
|---|---|---|---|
| 6,067,559 A | 5/2000 | Allard et al. | |
| 6,263,051 B1 | 7/2001 | Saylor et al. | |
| 6,269,336 B1 * | 7/2001 | Ladd et al. | 704/270 |
| 6,697,964 B1 * | 2/2004 | Dodrill et al. | 709/217 |
| 6,760,747 B2 * | 7/2004 | Allard et al. | 709/217 |
| 6,785,653 B1 * | 8/2004 | White et al. | 704/270 |
| 6,845,505 B1 * | 1/2005 | Adunuthula et al. | 718/104 |
| 6,922,411 B1 * | 7/2005 | Taylor | 370/401 |
| 6,961,712 B1 * | 11/2005 | Perkowski | 709/200 |
| 6,996,800 B2 * | 2/2006 | Lucassen et al. | 717/106 |
| 6,999,930 B1 * | 2/2006 | Roberts et al. | 704/270.1 |
| 7,072,984 B1 * | 7/2006 | Polonsky et al. | 709/217 |
| 7,149,287 B1 * | 12/2006 | Burger et al. | 379/88.17 |
| 7,170,979 B1 * | 1/2007 | Byrne et al. | 379/88.18 |
| 7,266,827 B1 * | 9/2007 | Sievert | 719/311 |
| 2002/0016814 A1 | 2/2002 | Convent et al. | |
| 2002/0054090 A1 | 5/2002 | Silva et al. | |
| 2002/0059470 A1 | 5/2002 | Allard et al. | |

FOREIGN PATENT DOCUMENTS

| | | |
|---|---|---|
| EP | 1 100 013 | 5/2001 |
| EP | 1 261 170 A1 | 11/2002 |
| WO | 03/005340 | 1/2003 |

OTHER PUBLICATIONS

Berners-Lee, T., et al., "RFC 2395: Uniform Resource Identifiers (URI): Generic Syntax," IETF, Aug. 1998, XP002233037, 33 pgs.

* cited by examiner

*Primary Examiner*—Ario Etienne
*Assistant Examiner*—Ramy M Osman
(74) *Attorney, Agent, or Firm*—Fish & Richardson P.C.

(57) ABSTRACT

A computer implemented method includes receiving a request that includes an action parameter and identifying a procedure that is associated with the value of the action parameter. If a procedure is identified, the identified procedure is executed. If a procedure is not identified, a script associated with the value of the action parameter is dispatched.

31 Claims, 10 Drawing Sheets

WEB APPLICATION ROUTER

TECHNICAL FIELD

This description relates to software applications that use a web communications protocol such as Hypertext Transfer Protocol (HTTP) to enable communications across a network.

BACKGROUND

With the advent of the Internet, the number of web applications (i.e., applications that use HTTP or a similar network communications protocol) has grown significantly. The development of web applications, therefore, has become increasingly important to software companies competing in the Internet age.

Web application development using a model-view-controller paradigm typically includes tasks performed by a user interface developer and a backend developer. The user interface developer is the developer of the presentation or view logic. The backend developer is the developer of the control logic which includes the code that enables the web application to access or receive data from backend systems, process the data, and send processed data back to the backend systems. The backend systems include computing systems that may be queried to obtain data as necessary while executing a web application. Such data may include, for example, login information and customer data.

Web application development may be delayed because of the coupling and interdependence of the tasks of the user interface developer and the backend developer. For example, a user interface developer may be forced to wait for backend integration to progress further before being able to continue developing the user interface.

SUMMARY

In one general aspect, a computer implemented method includes receiving a request that includes an action parameter and identifying a procedure that is associated with the value of the action parameter. If a procedure is identified, the identified procedure is executed. If a procedure is not identified, a script associated with the value of the action parameter is dispatched.

Implementations may include one or more of the following features. For example, the request may be a hypertext transfer protocol request. The procedure may be a method used in an object oriented programming language or a function used in a procedural programming language. After an identified procedure is executed, a script may be dispatched if executing the procedure does not result in a response being committed.

Identifying a procedure that is associated with the value of the action parameter may include searching a group of procedures in a program for a procedure that is associated with the value of the action parameter. Searching a group of procedures may include searching a group of procedures in a program for a procedure that has a name equal to the value of the action parameter. Searching a group of procedures may include searching a group of procedures in a program for a procedure that is associated with the value of the action parameter and that includes code that implements application control logic. Searching a group of procedures may include searching a group of procedures in a program for a procedure that is associated with the value of the action parameter and that includes code that enables communications with backend systems.

Searching a group of procedures may include searching a group of methods in a class for a method that is associated with the value of the action parameter. The method may be programmed in Java™

Searching a group of procedures may include searching a group of functions in a program for a function that is associated with the value of the action parameter. The function may be programmed in Perl.

Dispatching to a script associated with the value of the action parameter may include dispatching to a script saved under a file name corresponding to the value of the action parameter. Dispatching to a script may include dispatching to a script may include dispatching to a script that is associated with the value of the action parameter and that includes code that implements presentation logic. The presentation logic may implement a user interface. The user interface may be a voice user interface operable to communicate with a user of a voice communication device. The voice communication device may be a landline phone, a wireless phone, a voice-enabled personal digital assistant, or a voice-enabled computer.

The script that is associated with the value of the action parameter may include markup language code. The markup language code may include hypertext markup language, VoiceXML, SALT, or markup language used to communicate with wireless communication devices. The markup language used to communicate with wireless communication devices may include wireless markup language.

In another general aspect, a computer system includes a web application computer configured to receive a request that includes an action parameter and configured to identify a procedure that is associated with the value of the action parameter. The web application computer is further configured to execute the procedure if a procedure is identified and dispatch to a script associated with the value of the action parameter if a procedure is not identified.

Implementations may include one or more of the following features. For example, the web application computer may be further configured to send a response. The web application may be further configured to dispatch to the script after execution of the procedure if execution of the procedure does not result in a response being committed.

The web application computer may be configured to dispatch to a script including markup language used for communications with a wireless communication device. The markup language may include wireless markup language code. The web application application computer may be configured to dispatch to a script including VoiceXML or SALT code.

The computer system may further include a gateway computer. The gateway computer may be configured to communicate with a wireless communication device. The gateway computer may be a wireless application protocol gateway. The gateway computer may be a voice gateway configured to communicate with a voice communication device.

The details of one or more implementations are set forth in the accompanying drawings and the description below. Other features will be apparent from the description and drawings, and from the claims.

DETAILED DESCRIPTION

Figure 1:
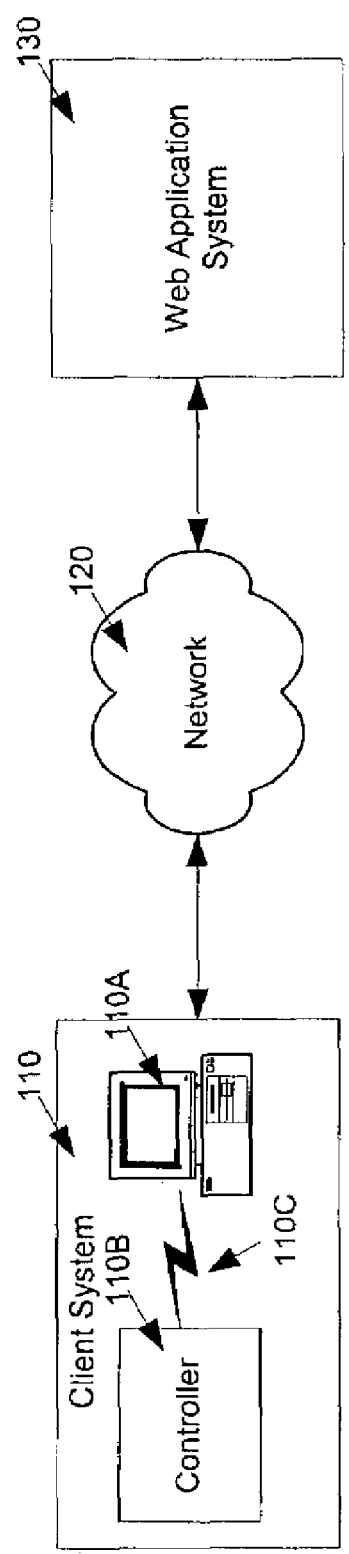
FIG. 1 is a block diagram of a communications system using web application routing logic to provide a flexible platform for web applications.

Referring to FIG. 1, a communications system 100 for using web application routing logic to provide a flexible platform for web application development includes a client system 110, a network 120, and a web application system 130. The client system 110 is configured to send requests and receive responses from the web application system 130. For example, the client system 110 may send and receive data using Hypertext Transfer Protocol (HTTP) or another protocol that enables web communications across a network. The HTTP responses are processed to communicate with a user of the client system 110. The client system 110 includes a device 110A capable of executing instructions under the command of a controller 110B. The device 110A may be a general purpose computer, such as a workstation or a personal computer, a personal digital assistant (PDA), a special purpose computer, an intelligent mobile phone, a pager, or a set top box.

The controller 110B commands and directs communications between the device 110A of the client system 110 and the web application system 130. The controller 110B may include one or more software or hardware applications that enable a user of the client system 110 to communicate using HTTP with the web application system 130. For example, the controller 110B may be a browser application on a personal computer that sends HTTP requests to the web application system 130, receives HTTP responses from the web application system 130, and processes hypertext markup language (HTML) code in the HTTP responses to display a web page or otherwise communicate with the user. The device 110A is connected to the controller 110B by a wired, wireless or virtual (i.e., when the controller is software running on the device) data pathway 110C capable of delivering data. In some implementations, the device 110B is a web browser running on the device 110A which is a personal computer.

In another implementation, the client system 110 is configured to communicate with a gateway (not shown) rather than with the web application system 130. In this implementation, the client system 110 exchanges data with the gateway which, in turn, communicates with the web application system 130 using HTTP. For example, the client system 110 may be a voice communication device, such as, for example, a landline phone, that exchanges voice data with a voice gateway, or the client system 110 may be a wireless device, such as, for example, a wireless phone, a pager or a radio transceiver, that exchanges data with a Wireless Application Protocol (WAP) gateway.

The network 120 is configured to enable direct or indirect communications between the client system 110 and the web application system 130. Examples of the network 120 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

The web application system 130 is a computer system configured to receive requests from the client system 110 over the network 120, process the requests in accordance with a web application that includes web application routing logic, and send corresponding responses to the client system 110. In an exemplary implementation, the requests and responses are communicated using HTTP.

In another implementation, the web application system 130 receives HTTP requests and sends HTTP responses to a gateway (not shown) that communicates with the client system 110. In this implementation, the client system 110 does not communicate with the web application system 130 directly using HTTP but rather communicates with the gateway which, in turn, communicates with the web application system 130 using HTTP. The gateway may be, for example, a voice gateway that is configured to process Voice Extensible Markup Language (VoiceXML) or Speech Application Language Tags (SALT) and exchange voice data with the client system 110. The gateway also may be a gateway configured to communicate with wireless communication devices. For example, the gateway may be a WAP gateway configured to process Wireless Markup Language (WML) and exchange data with the client system 110 using WAP. The gateway may be local to the web application system 130, local to the client system 110, or remote to both the web application system 130 and the client system 110 but communicatively coupled to them through network 120.

The web application includes a set of scripts and an HTTP response algorithm for responding to HTTP requests. The scripts are written in a scripting language (e.g., JavaServer Page™ (JSP), Active Server Pages™ (ASP), or PHP: Hypertext Preprocessor (PHP)) and typically include markup language code (e.g., HTML, VoiceXML, SALT, or WML). The HTTP response algorithm includes the web application routing logic and may be implemented as a program written in a procedural programming language (e.g., Perl or C) or, alternatively, may be implemented as a class written in an object-oriented programming language (e.g., C++, Visual Basic, or Java™).

The web application may be developed using a model-view-controller paradigm. In a model-view-controller paradigm, the functions of the program or the methods of the class implement application control logic. The application control logic coordinates the execution of scripts (i.e., the functions or methods may dispatch to one or more scripts during execution), accesses or receives selected data from local or remote computer systems or storage devices, processes the data, and sends the processed data to local or remote computer systems or storage devices. The scripts implement presentation (or view) logic. The presentation logic provides a user interface that enables a user of the client system 110 to interact with the web application.

The HTTP response algorithm includes web application routing logic that examines the value of an action parameter in a received HTTP request to determine which methods or functions and/or scripts should be executed in response to the received HTTP request. The action parameter is an additional parameter contained in the HTTP request that identifies the method, function, or script that should be executed by the web application routing logic. Other parameters contained in the HTTP request include a Universal Resource Locator (URL), a web context, and a web application name. For example, an HTTP request may be formatted as follows: http://www.mysite.com/mycontext/myapp?action=welcome. In this example, the HTTP request includes a Universal Resource Locator corresponding to "www.mysite.com," a web context corresponding to "mycontext," a web application name corresponding to "myapp," and an action parameter set to "welcome."

If a method or function corresponds to the value of the action parameter, then the web routing logic executes that method or function. If execution of that method or function does not result in an HTTP response being committed (i.e., an HTTP response is not prepared by the method or function for subsequent delivery to the client system 110), then the web routing logic dispatches to a script that corresponds to the value of the action parameter upon completion of the execution of the method or function. The application also dispatches to a script that corresponds to the value of the action parameter if the web application routing logic finds no method or function that corresponds to the value of the action parameter. In one implementation, a method, function, or script corresponds to the value of the action parameter if the value of the action parameter is a label or name used to store, invoke, or otherwise reference the corresponding method, function, or script. For example, a method named "authen" corresponds to an action parameter set to "authen."

Figure 2:
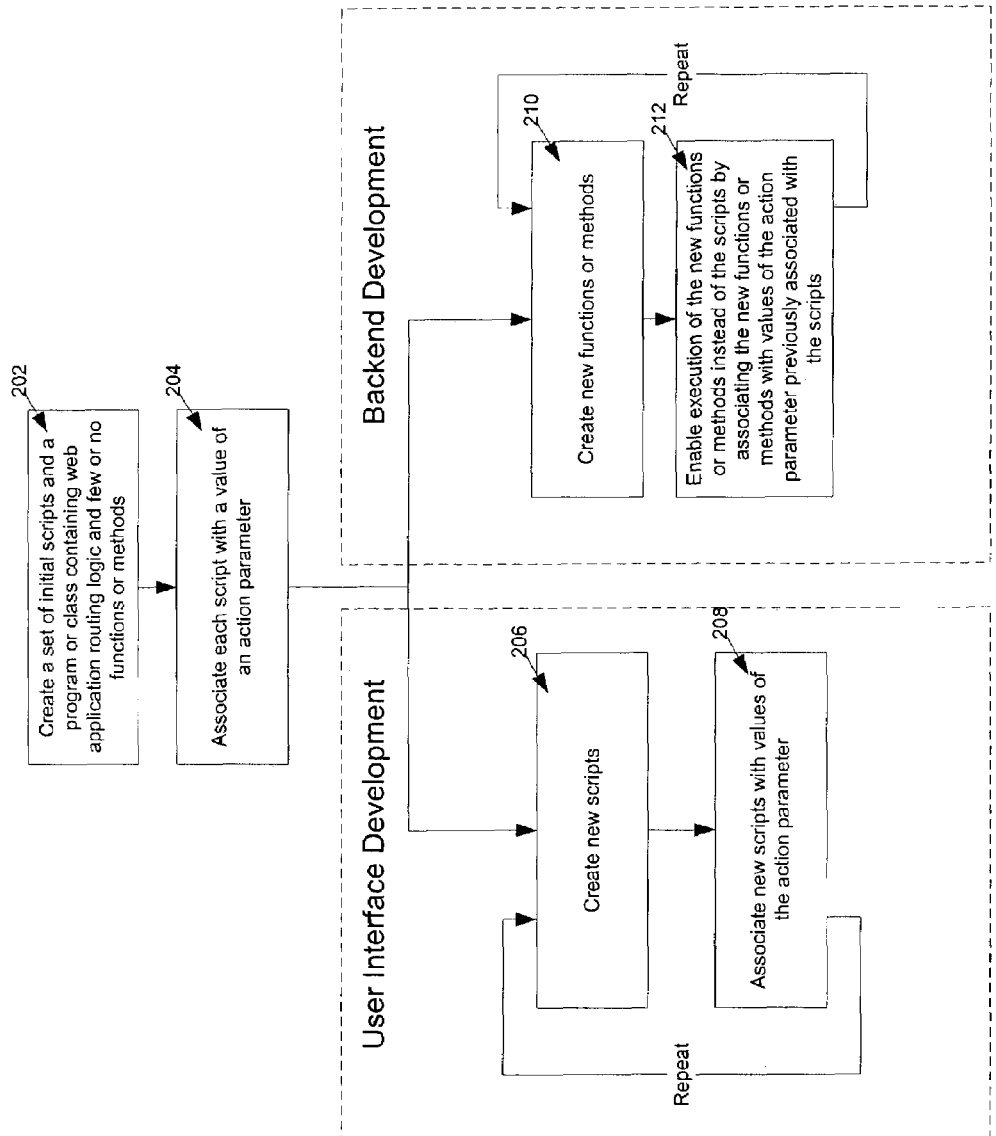
FIG. 2 is a flow chart of a process for developing a web application using web application routing logic.

FIG. 2 shows a process 200 for using web application routing logic to facilitate web application development by substantially decoupling the tasks of the user interface developer from those of the backend developer. The web application development begins by creating a set of initial scripts and creating a program or a class that contains web application routing logic and few or none of the functions or methods necessary for interactions with backend systems (202). The initial scripts present to the user of the client system 110 artificial or simulated results of interactions with backend systems.

Each script is associated with a value of an action parameter (204). In one implementation, associating a script with a value of the action parameter is accomplished by simply saving the script under a file name. The file name of the script (excluding extension) is the value of the action parameter that corresponds to that script (e.g., if the script is saved as "welcome.jsp", the value of the corresponding action parameter is "welcome.").

In the course of application development, the user interface developer creates new scripts (206) and associates the new scripts with values of the action parameter (208). The user interface developer does not need to wait for the backend developer to complete the backend integration and the corresponding control logic prior to creating scripts. After a user interface developer creates a new script, the web application routing logic in the class or program automatically dispatches to the script when an HTTP request including an action parameter with a value corresponding to the new script is received from the client system 110. The web application routing logic eliminates the need to change the dispatcher or to add additional code when adding a new script.

As the backend integration progresses, the backend developer creates new functions or methods in the class or program (210) and enables the execution of the new functions or methods to replace the execution of scripts by simply labeling, naming, or otherwise associating the new methods or functions with the value of the action parameter that was previously associated with the scripts (212). The scripts that present artificial or simulated results of interactions with backend systems are thereby replaced by new methods or functions developed by the backend developer that perform actual interactions with the backend systems and that instruct the same or other scripts to present the actual results of interactions with the backend systems to users. Typically, the initial scripts display default values of variables until replaced by a new function or method. The new function or method interacts with backend systems, assigns actual values to the variables, and dispatches to the same initial scripts which now present the actual rather than default values to users.

For example, when developing a web-based banking application, a script may be manually generated to present to the user an artificial bank account balance and may be executed in response to an HTTP request from the client system 110 that includes an action parameter set to "bankacct." When the backend developer completes the method or function that allows the web application system 130 to access actual bank account information from the computer systems of the bank (i.e., backend systems), execution of the script that presents an artificial bank account balance is replaced by execution of a method or function that accesses and coordinates presentation of an actual bank account balance to the user. The method or function that accesses and coordinates the presentation of an actual bank account balance to the user is simply inserted into the web application and labeled, named, or otherwise associated with the action parameter value "bankacct." The web application routing logic ensures that the method or function rather than the script executes when a received HTTP request includes an action parameter set to "bankacct."

In this manner, the web application routing logic enables the user interface development (206, 208) of a web application to be substantially decoupled from the backend development (210, 212) of a web application. The user interface developer is able to develop the user interface of the web application relatively independently from the development of the control logic and backend integration. The backend developer is able to complete the control logic and backend integration and smoothly insert the corresponding functions and methods into the program or class of the web application without significantly modifying or disrupting the user interface developed by the user interface developer.

Figure 3A:
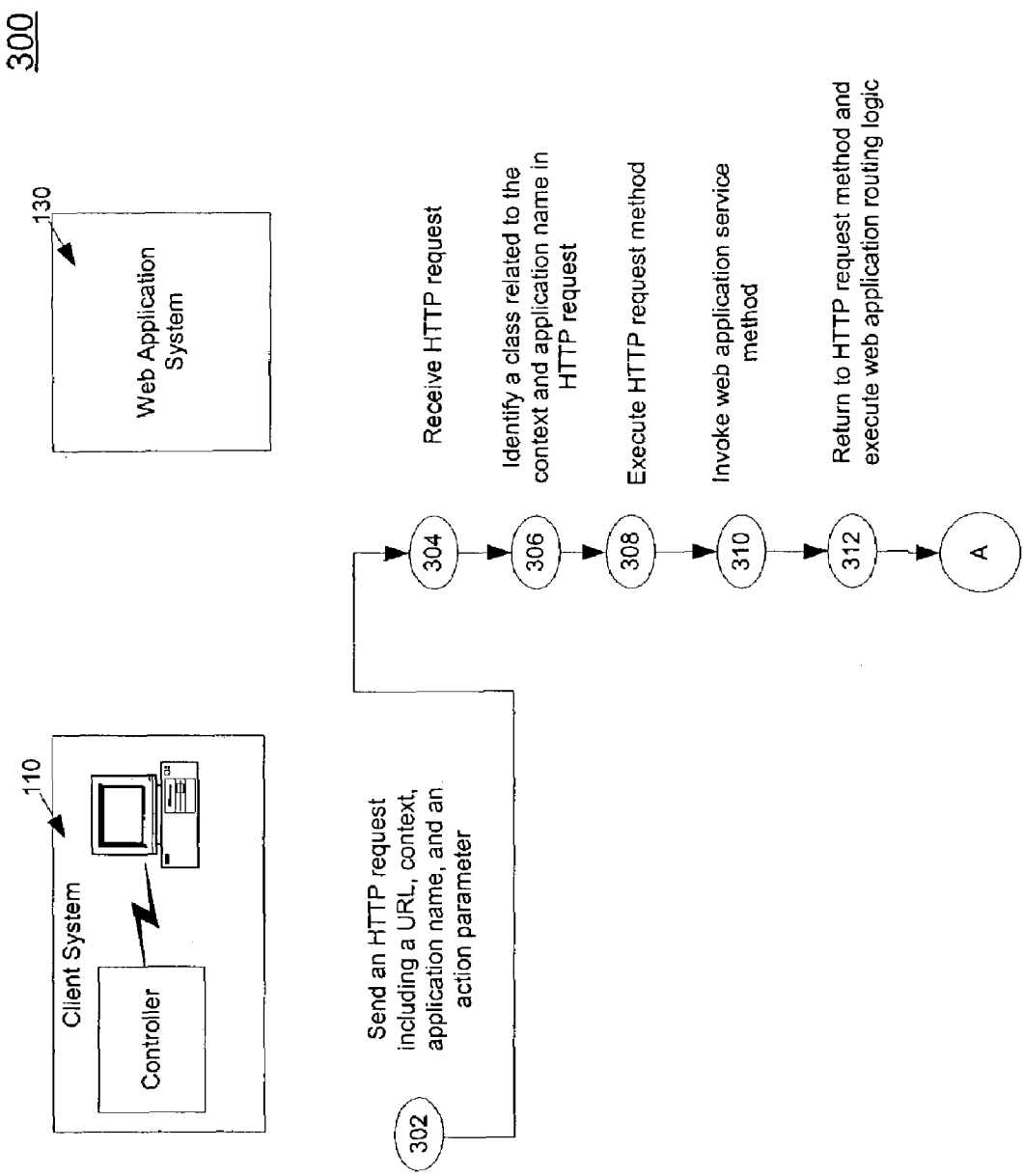
FIGS. 3A and 3B are a flow chart of a process for using web application routing logic to respond to HTTP requests.
Figure 3B:
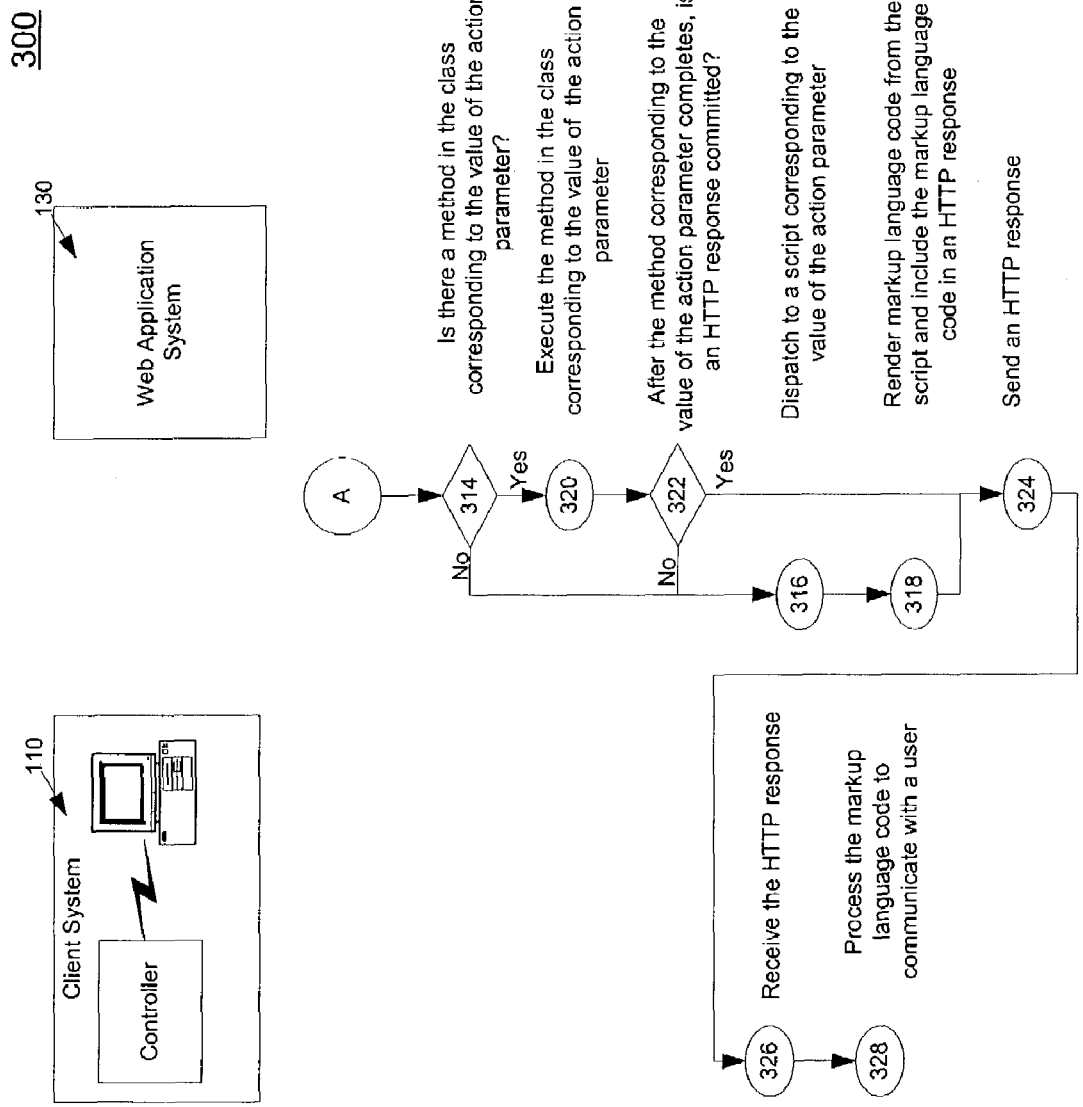

FIGS. 3A and 3B show a process 300 for using web application routing logic to respond to HTTP requests. For convenience, particular components described with respect to FIG. 1 are referenced as performing the process 300. However, similar methodologies may be applied in other implementations where different components are used to define the structure of the system, or where the functionality is distributed differently among the components shown by FIG. 1. Furthermore, process 300 assumes that the HTTP response algorithm of the web application is implemented as a class rather than as a program. However, the methodology disclosed by process 300 may be similarly applied to web applications in which the HTTP response algorithm is implemented as a program.

The process 300 assumes that the class is already instantiated (i.e., loaded). In general, instantiation of a class typically occurs prior to the web application server 130 receiving HTTP requests related to that class from the client system 110.

The client system 110 sends an HTTP request to the web application system 130 (302). The HTTP request includes a uniform resource locator (URL), a web context, a web application name, and an action parameter. The web application system 130 receives the HTTP request (304) and identifies a class related to the web context and the web application specified by the HTTP request (306). In one implementation, the web application system 130 identifies a class related to the web context and the web application name by accessing a data store containing data records storing names of classes and that may be indexed or otherwise accessed based on web context and web application name.

The web application system 130 executes an HTTP request method in the identified class (308). The HTTP request method is a method that is executed each time an HTTP request that includes a web context and a web application name related to the identified class is received from the client system 110. In this implementation, the HTTP request method contains the web application routing logic. The web application developer typically is not permitted to edit the contents of the HTTP request method.

The HTTP request method invokes (i.e., executes) a web application service method (310). The web application service method, unlike the HTTP request method, is a method that may be edited by the web application developer. The web application service method is executed every time the HTTP request method is executed (i.e., every time an HTTP request including a web context and a web application name related to the identified class is received from the client system 110). In a simple example, a developer may code the web application request method to increment a counter, and thereby keep track of the number of HTTP requests received by the web application system 130 that include a web context and a web application name related to the identified class.

When the web application service method finishes executing, the web application system 130 returns to the HTTP request method and executes the web application routing logic (312). The web application routing logic determines whether a method in the identified class corresponds to the value of the action parameter included in the HTTP request (314). In one implementation, a method in the identified class corresponds to the value of the action parameter if the name of the method is the same as the value of the action parameter.

If no method in the identified class corresponds to the value of the action parameter in the HTTP request, the web application routing logic dispatches to a script corresponding to the value of the action parameter (316). The web application system 130 renders markup language code from the script and includes the markup language code in an HTTP response (318). The HTTP response is sent to the client system 110 (324).

If a method in the identified class corresponds to the value of the action parameter in the HTTP request, the web application routing logic executes the method that corresponds to the value of the action parameter (320). Upon completion of the method, the web application routing logic determines whether an HTTP response was committed by the method (322).

If an HTTP response was committed by the method, then the web application routing logic sends the HTTP response to the client system 110 (324). If no HTTP response was committed by the method, then the web application routing logic dispatches to a script corresponding to the value of the action parameter (316). The web application system 130 renders markup language code from the script and includes the markup language code in an HTTP response (318) which is then sent to the client system 110 (324).

The client system 110 receives the HTTP response (326) and processes the markup language code to communicate with a user (328). In another implementation, a gateway, rather than the client system 110, sends HTTP requests (302), receives HTTP responses (326), and processes the markup language code to communicate with a user of the client system 110 (328).

Figure 4:
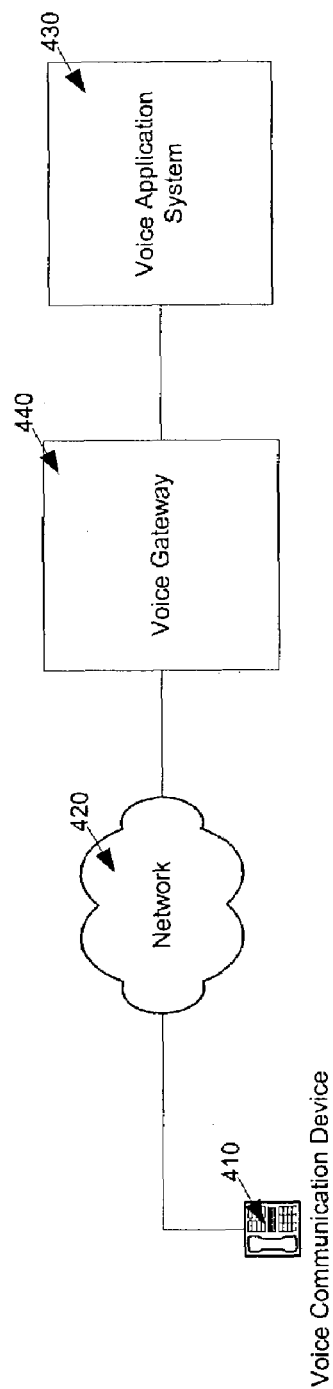
FIG. 4 is a block diagram of an implementation of the communications system of FIG. 1 that uses web application routing logic to provide a flexible platform for web-based voice applications.

FIG. 4 shows an implementation 400 of the communications system of FIG. 1 directed to using web application routing logic to provide a flexible platform for web-based voice application development. The communications system 400 includes a voice communication device 410, a network 420, a voice application system 430, and a voice gateway 440. The voice communication device 410, the network 420, and the voice application system 430 are described broadly above with respect to FIG. 1. In particular, the voice communication device 410, the network 420, and the voice application system 430 typically have attributes comparable to those described with respect to the client system 110, the network 120, and the web application system 130.

The voice communication device 410 is a device able to interface with a user to transmit voice signals across a network such as, for example, a landline phone, a wireless phone, a voice-enabled personal digital assistant (PDA), or a voice-enabled computer.

The network 420 may include a circuit-switched voice network, a packet-switched data network, or any other network able to carry voice. For example, circuit-switched voice networks may include the public switched telephone network (PSTN), and packet-switched data networks may include networks based on Internet protocol (IP) or asynchronous transfer mode (ATM), and may support voice using, for example, Voice-over-IP, Voice-over-ATM, or other comparable protocols used for voice data communications.

The voice application system 430 includes a voice application server and all computer systems that interface and provide data to the voice application server. The voice application system 430 is configured to receive HTTP requests from the voice gateway 440, process the HTTP requests in accordance with a web-based voice application that includes web application routing logic, and send corresponding HTTP responses to the voice gateway 440. The HTTP responses sent to the voice gateway 440 include voice markup language code, such as, for example VoiceXML or SALT code, that is rendered by the voice gateway 440 to communicate with a user of the voice communication device 410.

The voice gateway 440 is a gateway configured to receive user calls from voice communication devices 410 via the network 420 and respond to the user calls in accordance with the web-based voice application. Specifically, the voice gateway 440 generates HTTP requests based on a user call, sends the HTTP requests to the voice application system 430, receives corresponding HTTP responses from the voice application system 430, and renders the voice markup language code in the HTTP responses to communicate with the caller.

Figure 5:
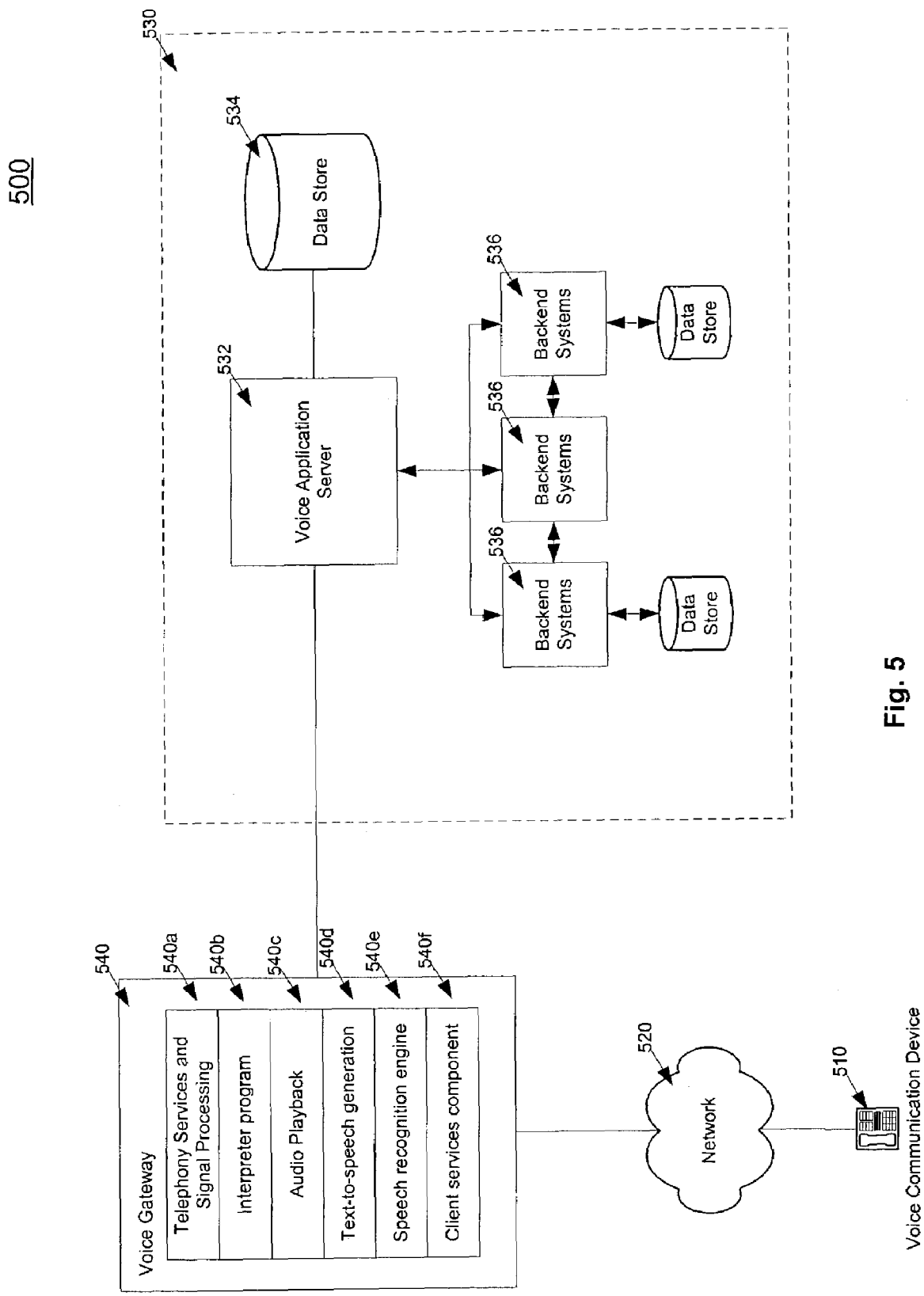
FIG. 5 is a block diagram of a detailed implementation of the communications system of FIG. 4.

FIG. 5 shows a communications system 500 similar to the communications system 400 but illustrating in greater detail an implementation of the voice application system 430 and the voice gateway 440. The communications system 500 includes a voice communication device 510, a network 520, a voice application system 530, and a voice gateway 540. The voice communication device 510, the network 520, the voice application system 530, and the voice gateway 540 are described broadly above with respect to FIG. 4. In particular the voice communication device 510, the network 520, the voice application system 530, and the voice gateway 540 typically have attributes comparable to those described with respect to the voice communication device 410, the network 420, the voice application system 430, and the voice gateway 440 of FIG. 4.

The voice application system 530 includes a voice application server 532 that communicates with the voice gateway 540, a data store 534, and one or more backend systems 536. The voice application server 532 provides the execution environment for processing the web-based voice application. The voice application server 532 receives HTTP requests from the voice gateway 540, processes the HTTP requests in accordance with a web-based voice application that includes web application routing logic, and sends corresponding HTTP responses that include voice markup language code to the voice gateway 540. The voice application server 532 may be local to the voice gateway 540 or may be located anywhere across a network accessible by the voice gateway 540.

The data store 534 is a storage device that stores files necessary for execution of the web-based voice application. Such files may include script files, prompt files, grammar files, and text-to-speech (TTS) text files.

Script files are text files that store the scripts of the web-based voice application. A script file includes a series of embedded tags. The tags indicate which part of the text file defines a prompt used to "speak" to the caller and which part defines a grammar used to "hear" and understand the spoken response of the caller. Script files also generally contain limited logic that controls the sequence and defines rules for how to respond to conditions, such as misunderstood speech or a lack of speech from the caller. The script files are processed by the voice application server 532 to render voice markup language code. The rendered voice markup language code is then sent in an HTTP response to the voice gateway 540 for further processing by an interpreter program 540b.

Prompt, grammar, and TTS text files are accessed by the interpreter program 540b of the voice gateway 540 when processing the voice markup language code received in an HTTP response from the voice application server 532. When executing a prompt instruction, the interpreter program 540b either accesses a prompt file that contains voice data that is directly "spoken" to the caller or, alternatively, accesses a TTS text file that is spoken to the user via the text-to-speech engine 540d of the voice gateway 540. Audio data stored in prompt files may be formatted in WAV or other audio data formats. When executing a grammar instruction, the interpreter program 540b accesses grammar files that contain a specification of the various ways in which a caller might respond to a prompt. Grammar files may be in a custom format specific to the speech recognition engine 540e or may be written, for example, in standard Java Grammar Specification Format (JGSF) or Speech Recognition Grammar Specification 1.0 extensible markup language (XML) or augmented Backus-Naur forms (ABNF).

The data store 534 may be external to or located inside the voice application server 532 or the voice gateway 540. Prompt and grammar files may be cached at the gateway 540 to decrease access time. The voice gateway 540 may also receive the prompt and grammar files from the data store 534 or from the voice application server 532 which obtains them from the data store 534. Alternatively, the voice gateway 540 may receive the prompt and grammar files from a completely different web server.

The backend systems 536 include computing systems in the computing environment of the voice application server 532 that may be queried by the application server to obtain data as necessary while executing a voice application. Such data may include, for example, login information and customer data.

The voice gateway 540 includes a telephony services and signal processing component 540a, an interpreter program 540b, an audio playback component 540c, a text-to-speech generation component 540d, a speech recognition engine 540e, and a client services component 540f.

Incoming calls are answered by the telephony services and signal processing component 540a of the voice gateway 540. The voice gateway 540 is provisioned in a manner similar to an interactive voice response (IVR) system and is usually located "downstream" of a private branch exchange (PBX) or automatic call director (ACD). This configuration allows callers to request transfer to a live operator if they experience problems. The voice gateway 540 also may be located at the customer site in front of the PBX or ACD (to save having to buy more ports on the PBX or ACD), or at the premises of a dedicated application service provider (ASP).

The interpreter program 540b is responsible for sending HTTP requests to and receiving HTTP responses from the voice application server 532, and processing voice markup language code to communicate with a caller. Processing voice markup language code to communicate with a caller includes generating outgoing speech or prompts using the audio playback component 540c and the text-to-speech generation component 540d of the voice gateway 540 and listening to spoken responses from the caller using the speech recognition engine 540e. The speech recognition engine 540e is equipped with or has access to grammars that specify the expected caller responses to a given prompt. The prompts that are generated in response to the spoken input of the caller vary depending on the caller response and whether or not it is consistent with a grammar. In this manner, the voice gateway 540 is able to simulate a conversation with the caller.

In typical operation, the telephony services and signal processing component 540a of the voice gateway 540 receives a call from a caller and obtains caller information. The client services component 540f relates the caller information (e.g., Automatic Number Identification (ANI) information) to a URL, a web context, and a web application name, and sends an HTTP request including the URL, the web context, and the web application name (and optionally an action parameter) to the voice application server 532. The voice application server 532 receives the HTTP request, processes the HTTP request in accordance with a web-based voice application, and sends an HTTP response that includes rendered voice markup language code to the voice gateway 540. The voice gateway 540 parses the received voice markup language code using the interpreter program 540b. The gateway 540 parses the voice markup language code by searching and executing voice-specific instructions. For example, the first voice-specific instruction may be a prompt instruction. The prompt instruction may be executed either by accessing and playing an audio file specified by the prompt instruction or by employing the text-to-speech generation component 540d to translate and play text included in the prompt instruction.

The next voice-specific instruction in the voice markup language code may be, for example, a grammar instruction. The interpreter program 540b of the gateway 540 processes the grammar instruction by handing off control to the speech-recognition engine 540e which tells the gateway 540 to pause and listen for spoken input from the caller.

Upon receiving spoken input from the caller, the speech recognition engine 540e determines whether the spoken input is consistent with the grammar specified by the grammar instruction. If the spoken input is consistent with the grammar, the voice markup language code may direct the voice gateway 540 to execute a prompt instruction tailored to the input. If the spoken input is not consistent with the grammar, the voice markup language code may direct the voice gateway 540 to execute a different prompt instruction that informs the caller that the system does not understand the caller.

The interpreter program 540b continues parsing and processing the voice markup language code in this manner. When the script is completed and the necessary responses are collected from the caller, the interpreter 540b assembles them into an HTTP request that is sent to the voice application server 532. The voice application server 532 processes the HTTP request and may send to the voice gateway 540 more rendered voice markup language code in another HTTP response.

Figure 6A:
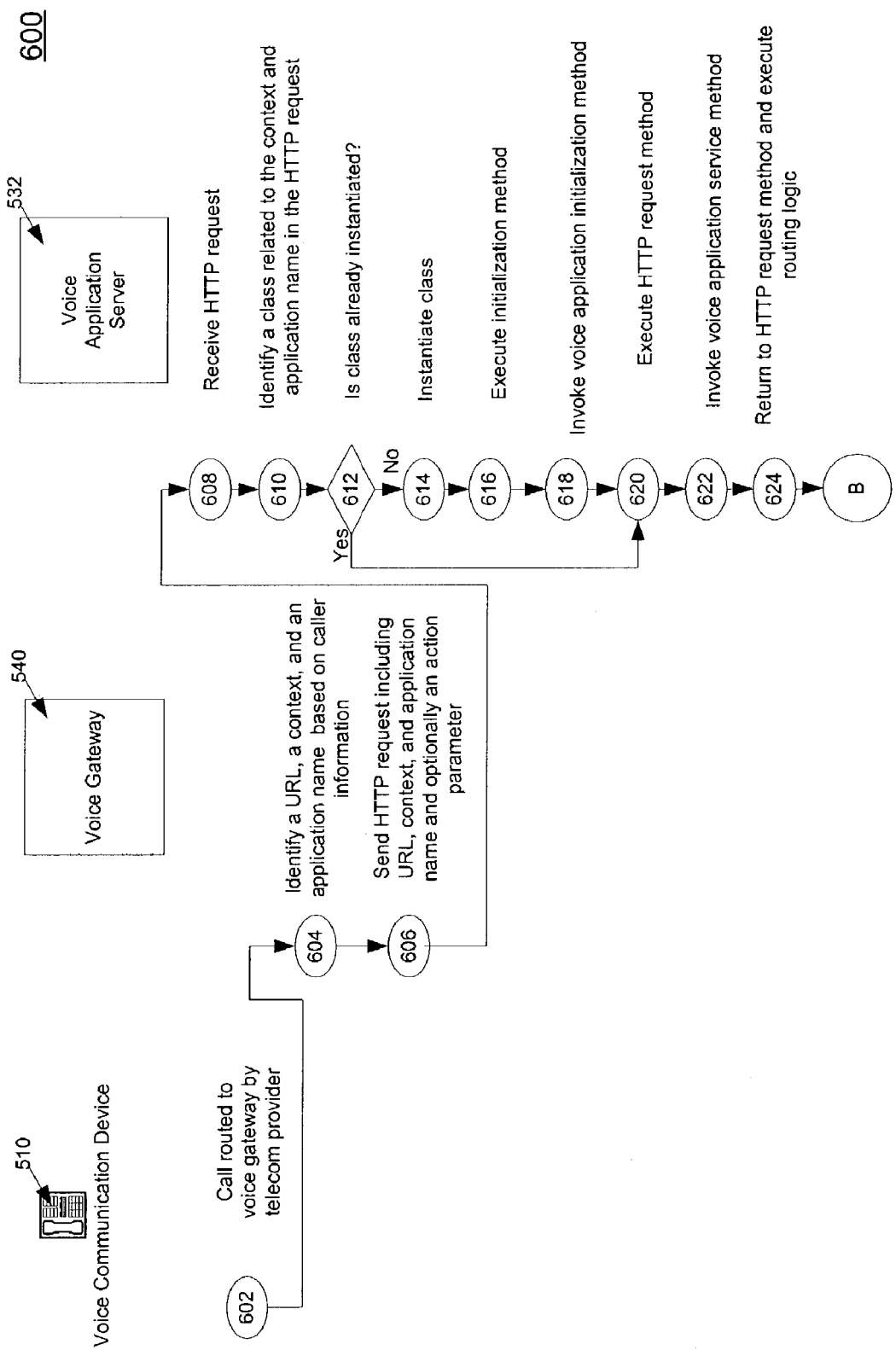
FIGS. 6A and 6B are a flow chart of a process for using web application routing logic to begin communications with a user of a voice communication device.
Figure 6B:
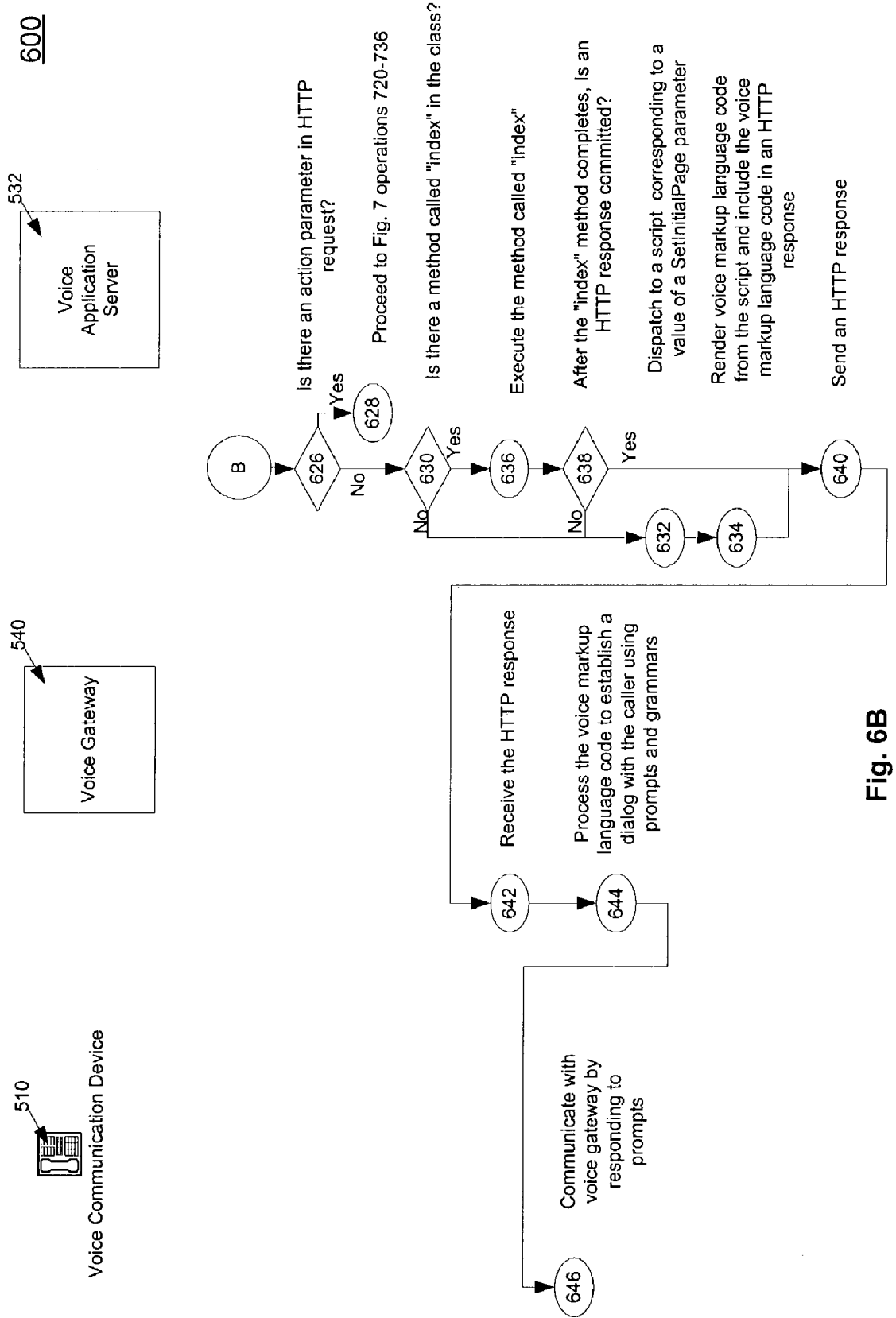

FIGS. 6A and 6B show a process 600 for using web application routing logic to begin communications with a user of a voice communication device 510 upon receiving a call from the user. For convenience, particular components described with respect to FIG. 5 are referenced as performing the process 600. However, similar methodologies may be applied in other implementations where different components are used to define the structure of the system, or where the functionality is distributed differently among the components shown by FIG. 5. Furthermore, process 600 assumes that the HTTP response algorithm of the web-based voice application is implemented as a class rather than as a program. However, the methodology disclosed by process 600 may be similarly applied to web applications in which the HTTP response algorithm is implemented as a program.

The user of the voice communication device 510 makes a call, and the call is routed to the voice gateway 540 by a telecommunications service provider (602). The voice gateway 540 receives the call and identifies a URL, a web context, and a web application name based on caller information (604). The caller information may include the caller telephone number (i.e., the telephone number of the user of voice communication device 510), the number the caller dialed (e.g., through Dialed Number Identification Service (DNIS)) and/or any information that may be derived by accessing data stores based on the caller telephone number, based on other ANI data, or based on DNIS data. The URL, the web context, and the web application name may be determined, for example, by accessing a local or remote data store relating URLs, web contexts, and web application names to caller telephone numbers. The voice gateway 540 sends an HTTP request that includes the URL, the web context, the web application name, and optionally an action parameter to the voice application server 532 (606).

The voice application server 532 receives the HTTP request (608) and identifies a class related to the web context and the web application name in the HTTP request (610).

The voice application server 532 determines whether the class is already instantiated (612).

If the class is not yet instantiated, the voice application server 532 instantiates the class (614). The voice application server then executes an initialization method in the class (616). The initialization method is a method that is executed when the class is instantiated. The initialization method typically loads resources such as logging system resources, which may, for example, track web application log information, and configuration system resources, which may, for example, initialize parameters and property values used in the web application. The initialization method also may set a default initial script that is processed under certain conditions (see operations 626-644 below) to establish an initial dialog with the user of the voice communication device 510. In the implementation shown in FIGS. 6A and 6B, the initialization method may specify the default initial script by assigning a value to a SetInitialPage parameter. For example, the initialization method may assign the value of "DefaultIndex" to the SetInitialPage parameter. The default initial script is then "DefaultIndex.jsp". The web-based voice application developer typically is not permitted to edit the contents of the initialization method.

The initialization method also invokes a voice application initialization method (618). The voice application initialization method, unlike the initialization method, is a method that may be edited by the web-based voice application developer. The voice application initialization method is executed every time the initialization method is executed (i.e., every time the corresponding class is instantiated). The voice application initialization method may be edited by the web-based voice application developer to load logging system resources and configuration system resources specific to the web-based voice application. The web-based voice application developer also may edit the voice application initialization method to change the value of the default initial script by assigning a new value to the SetInitialPage parameter (e.g., the SetInitialPage parameter may be assigned the new value of "InitialWelcomePage" which corresponds to an initial script named "InitialWelcomePage.jsp").

Upon completion of the voice application initialization method, the voice application server 532 executes an HTTP request method (620). The voice application server 532 also executes the HTTP request method if the identified class is already instantiated. As discussed previously in reference to process 300, the HTTP request method is executed each time an HTTP request is received. The HTTP request method invokes a voice application service method (622). The voice application service method is similar to the web application service method but directed to the needs and requirements of voice applications.

When the voice application service method finishes executing, the voice application server 532 returns to the HTTP request method and executes web application routing logic (624). The web application routing logic determines whether an action parameter was included in the HTTP request (626). If an action parameter was included in the HTTP request, then the process 600 proceeds to operations 720-736 shown in FIGS. 7A and 7B and discussed below (628).

If no action parameter was included in the HTTP request, then the web application routing logic determines if there is a method called "index" in the class (630). If there is no method called "index" in the class, the web application routing logic dispatches to a script corresponding to the value of the SetInitialPage parameter specified in the initialization method or in the voice application initialization method (616 or 618 above) (632). The voice application server 532 renders markup language code from the script and includes the markup language code in an HTTP response (634) which is then sent to the voice gateway 540 (640).

If there is a method called "index" in the class, the web application routing logic executes the method called "index" (636). The web application routing logic, thus, allows a web-based voice application developer to define operations in a method called "index" that will take place at the time a new dialog is initiated with a user of the voice communication device 510. The web application routing logic determines whether an HTTP response was committed by the method called "index" (638).

If an HTTP response was committed by the method called "index," then the web application routing logic sends the HTTP response to the voice gateway 540 (640). If no HTTP response was committed by the method, then the web application routing logic dispatches to a script corresponding to the value of the SetInitialPage parameter (632), renders voice markup language from the script (634), and sends an HTTP response to the voice gateway 540 (640).

The voice gateway 540 receives the HTTP response from the voice application server 532 (642) and processes the voice markup language code to establish a dialog with the user of the voice communication device 510 using prompts and grammars (644). The user of the voice communication device 510 communicates with the voice gateway by responding to the prompts (646).

Figure 7A:
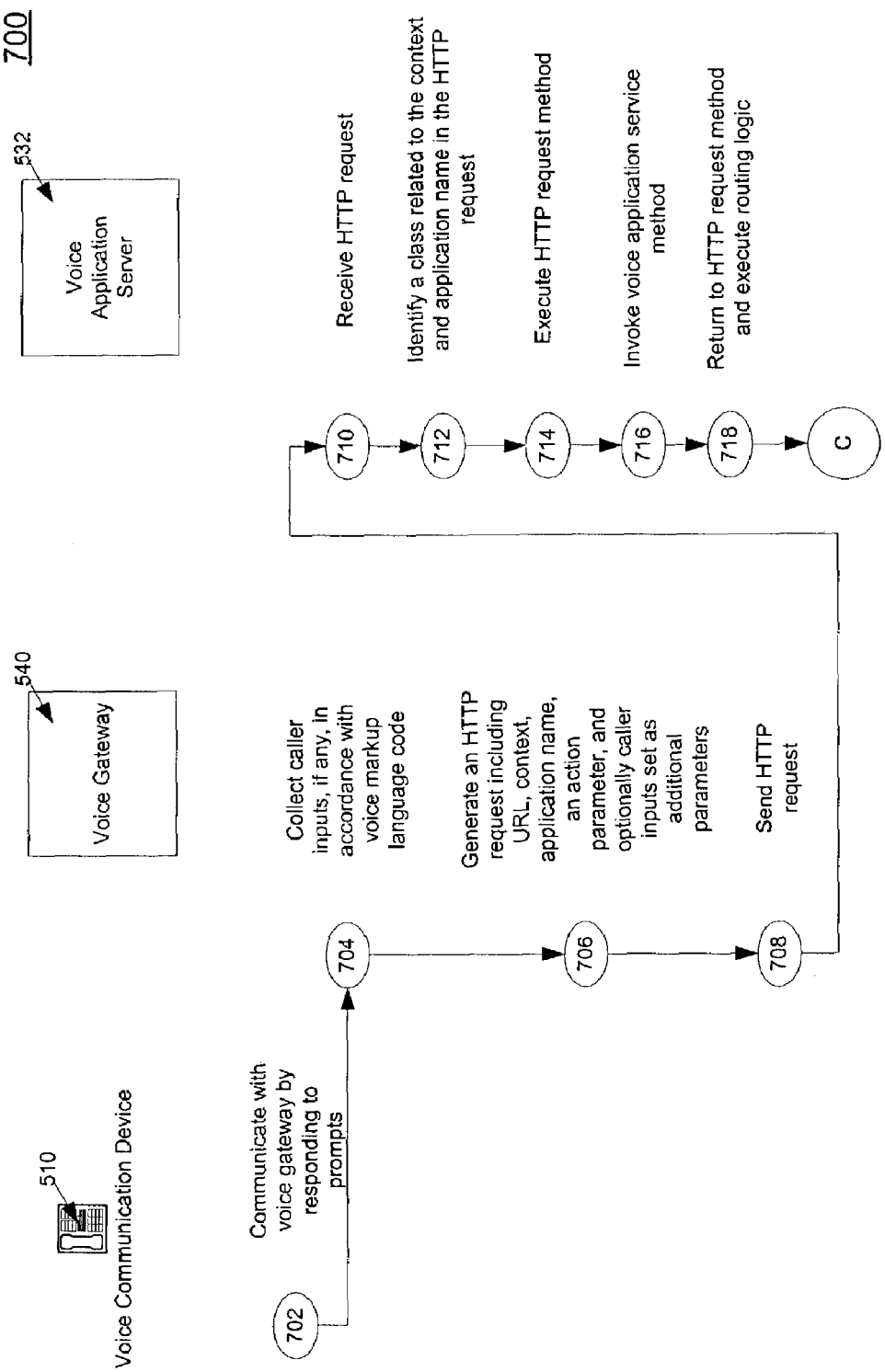
FIGS. 7A and 7B are a flow chart of a process for using web application routing logic to communicate with a user of a voice communication device.
Figure 7B:
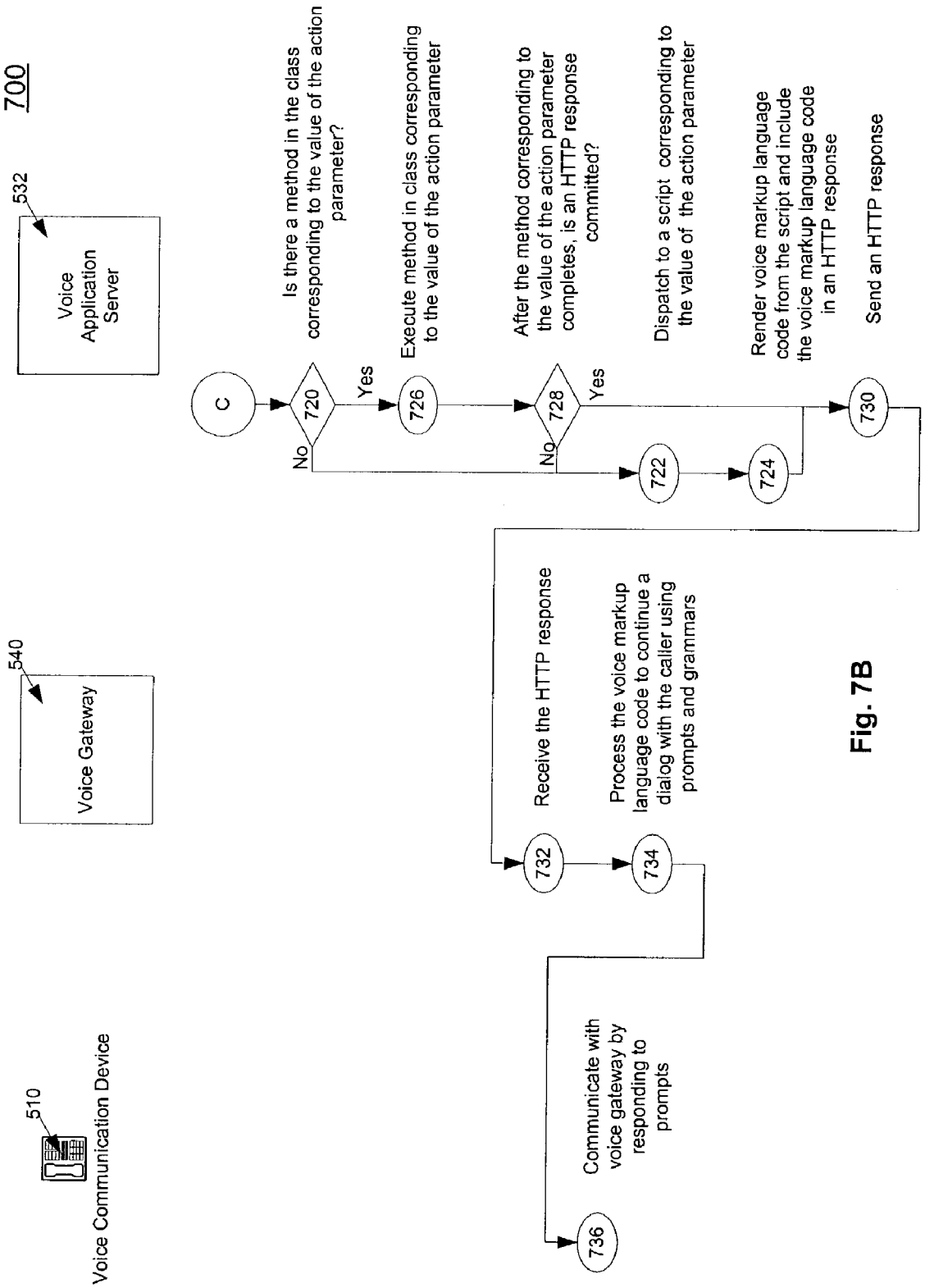

FIGS. 7A and 7B show a process 700 for using web application routing logic to communicate with a user of a voice communication device 510. For convenience, particular components described with respect to FIG. 5 are referenced as performing the process 700. However, similar methodologies may be applied in other implementations where different components are used to define the structure of the system, or where the functionality is distributed differently among the components shown by FIG. 5. Furthermore, process 700 assumes that the HTTP response algorithm of the web-based voice application is implemented as a class rather than as a program. However, the methodology disclosed by process 700 may be similarly applied to web applications in which the HTTP response algorithm is implemented as a program.

The user of the voice communication device 510 communicates with the voice gateway 540 by responding to prompts (702). The voice gateway 540 collects user responses, if any, in accordance with the voice markup language code that the voice gateway 540 is processing (704) and generates an HTTP request that includes a URL, a web context, a web application name, an action parameter, and, in some implementations, additional parameters corresponding to the responses received from the user of the voice communication device 510 (706). The voice gateway 540 then sends the HTTP request to the voice application server 532 (708).

For example, the voice gateway 540 may be processing voice markup language code rendered from a script called "getUser.jsp" that requests that the user of the voice communication device 510 submit a user identification (ID) and a user password. The user submits the user ID (e.g., "sue") and the user password (e.g., "123") using the voice communication device 510, and the voice markup language code instructs the voice gateway 540 to generate and send to the voice application server 532 the following corresponding HTTP request:

http://www.mysite.com/mycontext/myapp?action=authen&user=sue&password=123. In this example, the HTTP request includes a URL corresponding to "www.mysite.com," a web context corresponding to "mycontext", a web application name corresponding to "myapp," an action parameter set to "authen", and two additional parameters "user" and "password" set to "sue" and "123," respectively.

The voice application server receives the HTTP request from the voice gateway 540 (710) and identifies a class related to the web context and the web application name specified by the HTTP request (712). In one implementation, the voice application server 532 identifies a class related to the web context and the web application name by accessing a data store containing data records storing names of classes and that may be indexed or otherwise accessed based on web context and web application name.

The voice application server 532 executes an HTTP request method in the identified class (714). As discussed previously in reference to process 300, the HTTP request method is executed each time an HTTP request is received. The HTTP request method invokes a voice application service method (716). The voice application service method is similar to the web application service method but directed specifically to voice.

When the voice application service method finishes executing, the voice application server 532 returns to the HTTP request method and executes web application routing logic (718). The HTTP request method is a method that is executed each time an HTTP request that includes a web context and a web application name related to the identified class is received from the client system 110. In this implementation, the HTTP request method includes the web application routing logic. The web application developer typically is not permitted to edit the contents of the HTTP request method.

The web application routing logic determines whether a method in the identified class corresponds to the value of the action parameter included in the HTTP request (720). In one implementation, a method in the identified class corresponds to the value of the action parameter if the name of the method is the same as the value of the action parameter.

If no method in the identified class corresponds to the value of the action parameter in the HTTP request, the web application routing logic dispatches to a script corresponding to the value of the action parameter (722). The voice application server 532 renders markup language code from the script and includes the markup language code in an HTTP response (724). The HTTP response is sent to the voice gateway 540 (730).

If a method in the identified class corresponds to the value of the action parameter in the HTTP request, the web application routing logic executes the method that corresponds to the value of the action parameter (726). Upon completion of the method, the web application routing logic determines whether an HTTP response was committed by the method (728). If an HTTP response was committed by the method, then the web application routing logic sends the HTTP response to the voice gateway 540 (730). If no HTTP response was committed by the method, then the web application routing logic dispatches to a script corresponding to the value of the action parameter (722). The voice application server 532 renders markup language code from the script and includes the markup language code in an HTTP response (724) which is then sent to the voice gateway 540 (730).

The voice gateway 540 receives the HTTP response (732) and processes the voice markup language code to continue a dialog with the user of the voice communication device 510 using prompts and grammars (734). The user of the voice communication device 510 communicates with the voice gateway 540 by responding to the prompts (736).

In one implementation of processes 600 and 700, the scripts are written using JavaServer Pages and VoiceXML, and the HTTP response algorithm is written in Java™ as a class that extends a base class that, in turn, extends the javax.servlet.http.HttpServlet class. The class includes the voice application initialization method, the voice application service method, and methods defined by the web-based voice application developer. The base class includes the initialization method and the HTTP request method. The initialization method is the init method of the javax.servlet.http.HttpServlet with modifications that serve to load resources and to set the initial default page. The HTTP request method is the service method of the javax.servlet.http.HttpServlet with modifications that serve to implement the web application routing logic. The class is typically coded by the web-based voice application developer. Because the coding of the base class remains constant between web-based voice applications (i.e., the web application routing logic remains the same regardless of the web-based voice application in which it is used), the base class may be provided to the web-based voice application developer by a third party.

A number of implementations have been described. Nevertheless, it will be understood that various modifications may be made. For example, the web application routing logic may be applied to coordinate execution of general procedures in a program and is not limited to coordinating execution of just methods and functions. Accordingly, other implementations are within the scope of the following claims.

What is claimed is:

1. A computer implemented method for responding to a HyperText Transfer Protocol (HTTP) request, the method comprising:
   receiving a HTTP request from a client system, the HTTP request including a Universal Resource Locator (UIRL), a web context, a name of a web application, and an action parameter, the web application being a web application developed using a model-view-controller paradigm;
   determining whether a name used to invoke or store an application control logic procedure of the web application matches the value of the action parameter, the application control logic procedure including code that enables communication with backend computer systems;
   conditioned on determining that no name used to invoke or store an application control logic procedure of the web application matches the value of the action parameter, dispatching to a presentation script saved under a file name that matches the value of the action parameter and that is configured to deliver an HTTP response to the client system in response to the HTTP request; and
   conditioned on determining that a name used to invoke or store an application control logic procedure of the web application matches the value of the action parameter, executing the application control logic procedure and, subsequent to completing the execution of the application control logic procedure, conditionally dispatching to the presentation script,
   wherein conditionally dispatching to the presentation script comprises:
   determining whether executing the application control logic procedure results in dispatching to a second presentation script configured to deliver an HTTP response to the client system in response to the HTTP request,
   dispatching to the presentation script conditioned on determining that executing the application control logic procedure does not result in dispatching to a second presentation script configured to deliver an HTTP response to the client system in response to the HTTP request, and
   not dispatching to the presentation script conditioned on determining that executing the application control logic procedure results in dispatching to a second presentation script configured to deliver an HTTP response to the client system in response to the HTTP request.

2. The method of claim 1, wherein the application control logic procedure is a method used in an object oriented programming language.

3. The method of claim 1, wherein the application control logic procedure is a function used in a procedural programming language.

4. The method of claim 1, wherein determining whether a name used to invoke or store an application control logic procedure of the web application matches the value of the action parameter comprises searching a group of names used to invoke or store application control logic procedures of the web application for a name that matches the value of the action parameter.

5. The method of claim 4, wherein searching a group of names comprises searching a group of names used to invoke or store methods in a particular class.

6. The method of claim 5, wherein searching a group of names comprises searching a group of names used to invoke or store methods programmed in JavaTM.

7. The method of claim 4, wherein searching a group of names comprises searching a group of names used to invoke or store functions.

8. The method of claim 7, wherein searching a group of names comprises searching a group of names used to invoke or store functions programmed in Perl.

9. The method of claim 1, wherein dispatching to the presentation script comprises dispatching to a script that includes code that implements presentation logic.

10. The method of claim 9, wherein the presentation logic implements a user interface.

11. The method of claim 10, wherein the user interface is a voice user interface operable to communicate with a user of a voice communication device.

12. The method of claim 11, wherein the voice communication device comprises a landline phone, a wireless phone, a voice-enabled personal digital assistant, or a voice-enabled computer.

13. The method of claim 1, wherein the presentation script includes markup language code.

14. The method of claim 13, wherein the markup language code comprises hypertext markup language.

15. The method of claim 13, wherein the markup language code comprises VoiceXML or SALT.

16. The method of claim 13, wherein the markup language code comprises markup language used to communicate with wireless communication devices.

17. The method of claim 16, wherein the markup language used to communicate with wireless communication devices includes wireless markup language.

18. The method of claim 1, further comprising executing the presentation script to render markup language code conditioned on and subsequent to dispatching to the presentation script.

19. The method of claim 18, wherein the rendered markup language code is included in the HTTP response delivered to the client system.

20. The computer system of claim 1, wherein the web application computer is further configured to execute the presentation script to render markup language code conditioned on and subsequent to dispatching to the presentation script.

21. The computer system of claim 20, wherein the web application computer being configured to execute the presentation script comprises the web application computer being configured to execute the presentation script to include the rendered markup language code in the HTTP response delivered to the client system.

22. A computer system comprising:
a web application computer configured to:
receive a HTTP request from a client system, the HTTP request including a Universal Resource Locator (URL), a web context, a name of a web application, and an action parameter, the web application being a web application developed using a model-view-controller paradigm;
determine whether a name used to invoke or store an application control logic procedure of the web application matches the value of the action parameter, the application control logic procedure including code that enables communication with backend computer systems;
conditioned on determining that no name used to invoke or store an application control logic procedure of the web application matches the value of the action parameter, dispatch to a presentation script saved under a file name that matches the value of the action parameter and that is configured to deliver an HTTP response to the client system in response to the HTTP request; and
conditioned on determining that a name used to invoke or store an application control logic procedure of the web application matches the value of the action parameter, execute the application control logic procedure and, subsequent to completing the execution of the application control logic procedure, conditionally dispatch to the presentation script, wherein the web application computer being configured to conditionally dispatch to the presentation script comprises the web application computer being configured to:
determine whether executing the application control logic procedure results in dispatching to a second presentation script configured to deliver an HTTP response to the client system in response to the HTTP request,
dispatch to the presentation script conditioned on determining that executing the application control logic procedure does not result in dispatching to a second presentation script configured to deliver an HTTP response to the client system in response to the HTTP request, and
not dispatch to the presentation script conditioned on determining that executing the application control logic procedure results in dispatching to a second presentation script configured to deliver an HTTP response to the client system in response to the HTTP request.

23. The computer system of claim 22, wherein the application control logic procedure is a method.

24. The computer system of claim 22, wherein the application control logic procedure is a function.

25. The computer system of claim 22, further comprising a gateway computer.

26. The computer system of claim 25, wherein the gateway computer is a gateway configured to communicate with a wireless communication device.

27. The computer system of claim 26, wherein the gateway computer is a wireless application protocol gateway.

28. The computer system of claim 25, wherein the gateway computer is a voice gateway configured to communicate with a voice communication device.

29. The computer system of claim 22, wherein the presentation script includes markup language used for communication with a wireless communication device.

30. The computer system of claim 29, wherein the markup language includes wireless markup language code.

31. The computer system of claim 22, wherein the web application computer is configured to dispatch to a script including VoiceXML or SALT code.

* * * * *